Patented Sept. 6, 1949

2,481,241

UNITED STATES PATENT OFFICE 2,481,241

METHOD FOR REMOVING CHLORINE FROM MIXTURES CONTAINING CHLORINE DIOXIDE AND CHLORINE

William Howard Rapson and Morris Wayman, Hawkesbury, Ontario, Canada, assignors to Canadian International Paper Company, Montreal, Quebec, Canada, a corporation of Canada No Drawing. Application February 15, 1946, Serial No. 647,994

9 Claims. (Cl. 23—152)

This invention relates to new and useful improvements in processes for removing chlorine from gaseous mixtures containing chlorine dioxide and chlorine.

In the past several methods have been developed for the production of gaseous mixtures containing chlorine dioxide and chlorine useable in connection with certain processing industries. However, in connection with some other processes there is need for chlorine dioxide substantially free from chlorine, and in the past attempts have been made to effect the removal of chlorine from chlorine dioxide mixtures, as for example, by contacting the gaseous mixtures with aqueous caustic solutions or with aqueous solutions of various carbonates. It is believed that substantially all of such prior methods for the removal of chlorine from the chlorine-chlorine dioxide mixtures are suitable for only batch treatment of such mixtures.

We have found that by our process chlorine can be readily removed from gaseous mixtures containing chlorine and chlorine dioxide by the addition of gaseous sulphur dioxide without substantially decreasing the chlorine dioxide content of such mixtures. Further, our process is particularly adaptable in connection with the continuous removal of chlorine from a continuously flowing gaseous mixture containing chlorine and chlorine dioxide, although it can be readily employed in connection with batch operations as well.

It is therefore an object of this invention to provide a novel continuous process for effecting the removal of chlorine from a gaseous mixture containing chlorine dioxide and chlorine.

Another object of this invention is to provide in a process of the character stated the step of adding gaseous sulphur dioxide to the gaseous mixture in order to effect the removal of chlorine therefrom.

Another object of this invention is to so regulate the addition of sulphur dioxide to the gaseous mixture that substantially all of the chlorine will be removed therefrom without substantially decreasing the chlorine dioxide content thereof.

Another object of this invention is to provide a process of the character stated which is adaptable for use in connection with the removal of chlorine from such gaseous mixtures either as a continuous operation or as a batch operation.

In our copending application, Ser. No. 640,592, filed January 11, 1946, we have disclosed and claimed a process and apparatus for continuously producing a gaseous mixture containing chlorine dioxide and selectively controlled amounts of chlorine by the reaction of gaseous sulphur dioxide with an aqueous solution of a metallic chlorate. The gaseous mixture produced in accordance with that invention as well as that which may be produced by other known methods of forming chlorine-chlorine dioxide mixtures may serve as the mixture from which the chlorine is to be removed in accordance with the invention herein disclosed. We have found that when sulphur dioxide is added to mixtures of chlorine and chlorine dioxide, the sulphur dioxide reacts relatively rapidly with the chlorine, and only relatively slowly with the chlorine dioxide. In addition, we have found that when sulphur dioxide is added in properly controlled amounts to mixtures of chlorine and chlorine dioxide, the chlorine reacts with and thus uses up the sulphur dioxide before there is any substantial attack on the chlorine dioxide. As a result of our discoveries, we are able to remove chlorine from mixtures of chlorine and chlorine dioxide by the addition of suitable quantities of sulphur dioxide thereto, the sulphur dioxide reacting with and removing the chlorine therefrom while the chlorine dioxide is substantially unaffected.

While the reactions of sulphur dioxide with chlorine and with chlorine dioxide have been extensively studied, it is not possible as yet to give a full explanation of the efficacy of our method. An explanation will be attempted here, but the usefulness of our invention is independent of the correctness of such explanation.

It has been demonstrated that perfectly dry, gaseous chlorine dioxide and dry, gaseous sulphur dioxide will not react, at temperatures substantially below the temperature at which chlorine dioxide decomposes. No substance is known to us which will by catalytic action, promote a reaction between dry chlorine dioxide and dry sulphur dioxide. However, in the presence of relatively substantial amounts of water vapor, a reaction between the three substances, chlorine dioxide, sulphur dioxide and water takes place, in accordance with the reaction set forth hereinbelow:

$$2ClO_2 + 5SO_2 + 6H_2O \rightarrow 5H_2SO_4 + 2HCl \quad (1)$$

This reaction is, however, relatively slow.

The reaction between chlorine and sulphur dioxide, on the other hand, is not dependent upon the presence of water. Perfectly dry, gaseous chlorine and dry gaseous sulphur dioxide will react, under the influence of certain catalysts many of which are well known, in accordance with the equation set forth hereinbelow:

$$SO_2 + Cl_2 \rightarrow SO_2Cl_2 \qquad (2)$$

In the presence of water vapor, however, the reaction takes a somewhat different course, represented by the following equation:

$$Cl_2 + SO_2 + 2H_2O \rightarrow H_2SO_4 + 2HCl \qquad (3)$$

This reaction is relatively rapid.

The gaseous or vaporous products of chlorine dioxide generators such as are in practical use at the present time contain some or all of the following constituents: chlorine dioxide, chlorine, water vapor, hydrochloric acid, sulphuric acid, inert gaseous diluents such as air, nitrogen or the residual impure nitrogen which accompanies the sulphur dioxide produced in conventional sulphur burners, and such mixtures are generally confined, at least while being conducted from the generator to an absorption column or the point of use, in pipes or vessels made of glass, porcelain or suitable metallic alloys. When sulphur dioxide is added to such mixtures, some or all of the reactions set forth above take place. The discovery which we have made is probably to be explained by the relatively rapid rate of reaction (3) compared with the relatively slow rate of reaction (1). In addition, it will be seen by examination of reaction (3) as set forth above that each atom of chlorine requires one molecule of water for reaction. In the case of chlorine dioxide (reaction (1)) each atom of chlorine requires three molecules of water. Therefore the amount of water required to remove the chlorine is much less than that required to react with the chlorine dioxide. When the amount of water vapor is relatively small, as is usually the case with practical chlorine dioxide generators, little, if any, of the chlorine dioxide will enter into the reaction.

It will also be apparent that any catalytic effects due to constituents of the mixture or the walls of the confining vessel which would further reaction (2) would increase the efficacy of our process.

We have found that if a relatively large excess of sulphur dioxide is added, the chlorine dioxide is attacked, and the economy of the process suffers in consequence. Hence the amount of $SO_2$ to be added is carefully regulated. The amount added is controlled by analyzing the product for chlorine and for chlorine dioxide, the correct amount in any instance being the smallest amount which will remove substantially all the chlorine, with the least destruction of chlorine dioxide.

In many instances the chlorine dioxide mixture free from chlorine may be directly used in gaseous form, while for other purposes the gaseous form is not desirable. In such instances the chlorine-free, gaseous mixture may be readily absorbed in water and the solution thus produced can be used.

While the above disclosure should provide an ample demonstration of the principles involved in practicing our process a specific example will now be referred to as illustrative of one way in which the process may be efficiently practiced:

To a gas stream in which were flowing 231 grams per hour chlorine dioxide and 23 grams chlorine, diluted with air to about 30 mm. Hg partial pressure of chlorine dioxide, 74.7 grams per hour sulphur dioxide was added. The resulting gas mixture was absorbed in water, and a sample analyzed. The solution yielded 229 grams per hour chlorine dioxide. In addition there was present 175 grams per hour acids, calculated as sulphuric acid. The amount of chlorine present was near the lower limit of the quantities which can be determined by presently-known analytical methods, about 1 part in 115 parts of chlorine dioxide.

It will be observed that acids are formed in this reaction as a by-product. For some purposes it may be necessary to remove these acids by means of a suitable scrubbing device. However, for many purposes the presence of these acids is not objectionable, and we have found that when the chlorine dioxide solution was used in bleaching pulp, the acid present due to the method of removing chlorine herein disclosed did not adversely affect the course of the bleaching or the properties of the product.

The sulphur dioxide which is employed in the practice of our process may be either pure gaseous sulphur dioxide, may be diluted with air or other inert diluent gas, or may be as produced by an ordinary sulphur burner. In relatively small scale operations, such as in the laboratory, the use of pure or commercial sulphur dioxide as usually packaged in cylinders is most convenient. In large scale operations, dilute sulphur dioxide from a conventional sulphur burner is most economical. When the chlorine dioxide and chlorine mixture is greatly diluted, as is usually the case for reasons of safety in handling chlorine dioxide, the use of diluted sulphur dioxide causes a further dilution of the chlorine dioxide. This further dilution hinders the absorption of the chlorine dioxide in water, and may necessitate larger capacity absorption towers when the chlorine dioxide is to be used in aqueous solution. In any particular installation all of these factors are balanced against one another, and the choice of source of sulphur dioxide is a matter of convenience and economy.

It is, of course, to be understood that various modifications of the herein disclosed process may be resorted to within the scope of the appended claims and it is not intended that the specific example provided herein be the only manner of effecting our process.

We claim:

1. In a process for the removal of chlorine from a gaseous mixture containing chlorine dioxide, chlorine and water vapor, the step of adding to said gaseous mixture gaseous sulphur dioxide.

2. A continuous process for removing chlorine from a continuously flowing gaseous mixture containing chlorine dioxide, chlorine, and water vapor, consisting in constantly adding gaseous sulphur dioxide to said gaseous mixture whereby said chlorine and sulphur dioxide will react in the presence of water to remove said chlorine from said mixture without substantially decreasing the amount of chlorine dioxide contained therein.

3. A continuous process for removing chlorine from a gaseous mixture containing chlorine dioxide, chlorine, and water vapor comprising continuously introducing a stream of said gaseous mixture into a reaction chamber and constantly adding gaseous sulphur dioxide to said gaseous mixture in said reaction chamber at a rate sufficient to react with the chlorine in said mixture in the presence of water to remove the chlorine therefrom without substantially decreasing the amount of chlorine dioxide contained in said mixture.

4. A continuous process for removing chlorine from a gaseous mixture containing chlorine dioxide, chlorine, and water vapor comprising continuously introducing a stream of said gaseous mixture into a reaction chamber, constantly adding gaseous sulphur dioxide to said gaseous mixture in said reaction chamber at a rate sufficient to react with the chlorine in said mixture in the presence of water to remove the chlorine therefrom without substantially decreasing the amount of chlorine dioxide contained in said mixture, and continuously withdrawing from said reaction chamber a gaseous mixture containing chlorine dioxide substantially free from chlorine.

5. A continuous process for removing chlorine from a moist gaseous mixture containing chlorine dioxide, chlorine, and in inert diluent gas comprising continuously passing a stream of said gaseous mixture through a reaction chamber and constantly adding gaseous sulphur dioxide to said gaseous mixture in said chamber at a rate sufficient to react with the chlorine in said mixture in the presence of moisture without reacting with any substantial quantity of chlorine dioxide contained in said mixture whereby to remove the chlorine from said mixture without substantially decreasing the amount of chlorine dioxide contained therein.

6. A continuous process for removing chlorine from a moist gaseous mixture containing chlorine dioxide, chlorine, and an inert diluent gas comprising continuously passing a stream of said gaseous mixture through a reaction chamber, constantly adding gaseous sulphur dioxide to said gaseous mixture in said chamber at a rate sufficient to react with the chlorine in said mixture in the presence of moisture without reacting with any substantial quantity of chlorine dioxide contained in said mixture whereby to remove the chlorine from said mixture without substantially decreasing the amount of chlorine dioxide contained therein, and continuously withdrawing from said reaction chamber a gaseous mixture containing chlorine dioxide substantially free from chlorine.

7. A continuous process for removing chlorine from a continuously flowing gaseous mixture containing chlorine dioxide and chlorine, consisting in constantly adding gaseous sulphur dioxide to said gaseous mixture whereby said chlorine and sulphur dioxide will react to remove said chlorine from said mixture without substantially decreasing the amount of chlorine dioxide contained therein.

8. A continuous process for removing chlorine from a gaseous mixture containing chlorine dioxide and chlorine, comprising continuously introducing a stream of said gaseous mixture into a reaction chamber and constantly adding gaseous sulphur dioxide to said gaseous mixture in said reaction chamber at a rate sufficient to react with the chlorine in said mixture to remove the chlorine therefrom without substantially decreasing the amount of chlorine dioxide contained in said mixture.

9. A continuous process for removing chlorine from a gaseous mixture containing chlorine dioxide and chlorine, comprising continuously introducing a stream of said gaseous mixture into a reaction chamber, constantly adding gaseous sulphur dioxide to said gaseous mixture in said reaction chamber at a rate sufficient to react with the chlorine in said mixture to remove the chlorine therefrom without substantially decreasing the amount of chlorine dioxide contained in said mixture, and continuously withdrawing from said reaction chamber a gaseous mixture containing chlorine dioxide substantially free from chlorine.

WILLIAM HOWARD RAPSON.
MORRIS WAYMAN.

REFERENCES CITED

The following references are of record in the file of this patent:

FOREIGN PATENTS

| Number | Country | Date |
|---|---|---|
| 14,342 | Great Britain | 1903 |